(12) United States Patent
Gubanov

(10) Patent No.: US 11,977,564 B2
(45) Date of Patent: May 7, 2024

(54) SYSTEMS AND METHODS FOR INTERACTIVE LARGE-SCALE DATA SEARCH AND PROFILING

(71) Applicant: The Florida State University Research Foundation, Inc., Tallahassee, FL (US)

(72) Inventor: Mikhail Gubanov, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 18 days.

(21) Appl. No.: 17/503,572

(22) Filed: Oct. 18, 2021

(65) Prior Publication Data
US 2022/0129486 A1    Apr. 28, 2022

Related U.S. Application Data

(60) Provisional application No. 63/104,230, filed on Oct. 22, 2020.

(51) Int. Cl.
*G06F 7/00* (2006.01)
*G06F 16/245* (2019.01)
(Continued)

(52) U.S. Cl.
CPC .......... *G06F 16/287* (2019.01); *G06F 16/245* (2019.01); *G06F 16/248* (2019.01); *G06N 20/00* (2019.01)

(58) Field of Classification Search
CPC .... G06F 16/287; G06F 16/245; G06F 16/248; G06F 16/838; G06F 16/83; G06F 16/258;
(Continued)

(56) References Cited

U.S. PATENT DOCUMENTS

2015/0378604 A1\* 12/2015 Kawakami .......... G06F 13/4022
 710/5
2016/0055205 A1\* 2/2016 Jonathan ............. G06F 16/2456
 707/714

(Continued)

OTHER PUBLICATIONS

M. Abadi. TensorFlow: Large-scale machine learning on heterogeneous systems, 2015, 19 pages. Software available from tensorflow.org.

(Continued)

*Primary Examiner* — Mohammad A Sana
(74) *Attorney, Agent, or Firm* — Meunier Carlin & Curfman LLC

(57) ABSTRACT

Described herein are systems and methods for profiling structured or semi-structured datasets. An example computer-implemented method includes grouping, using a machine learning classifier, a plurality of tables in a dataset that are associated with an object into a cluster, where each of the tables of the cluster includes respective data and respective metadata, the respective metadata including at least one respective attribute, generating a metadata-profile for the cluster, where the metadata-profile includes the at least one respective attribute of each of the tables of the cluster; and querying the cluster using the metadata-profile.

17 Claims, 9 Drawing Sheets

(51) Int. Cl.
  *G06F 16/248* (2019.01)
  *G06F 16/28* (2019.01)
  *G06N 20/00* (2019.01)
(58) Field of Classification Search
  CPC .... G06F 16/2456; G06F 40/177; G06F 40/18; G06N 20/00
  See application file for complete search history.

(56) References Cited

U.S. PATENT DOCUMENTS

2017/0098245 A1* 4/2017 Palanciuc .......... G06Q 30/0266
2018/0113907 A1* 4/2018 Gulwani .............. G06F 40/177

OTHER PUBLICATIONS

Z. Abedjan, L. Golab, F. Naumann, and T. Papenbrock. Data Profiling. Synthesis Lectures on Data Management. Morgan & Claypool, 2018, 156 pages.

M. J. Cafarella, A. Halevy, D. Z. Wang, E. Wu, and Y. Zhang. Webtables: exploring the power of tables on the web. VLDB, 2008, 12 pages.

M. J. Cafarella, I. F. Ilyas, M. Kornacker, T. Kraska, and C. Re. Dark data: Are we solving the right problems? In ICDE, 2016, 2 pages.

Z. Chen, Q. Chen, B. Hou, Z. Li, and G. Li. Towards interpretable and learnable risk analysis for entity resolution. In SIGMOD'20, Jun. 14-19, 2020, 16 pages.

P. Cudré-Mauroux. Leveraging knowledge graphs for big data integration: the XI pipeline. Semantic Web, 11(1):13-17, 2020.

Gentile, A. Lisa, P. Ristoski, S. Eckel, D. Ritze, and H. Paulheim. Entity matching on web tables: a table embeddings approach for blocking. In EDBT, 2017, 510-513.

M. Gubanov. Hybrid: A large-scale in-memory image analytics system. In CIDR, 2017, 1 page.

M. Gubanov. Polyfuse: A large-scale hybrid data fusion system. In ICDE, 2017, 4 pages.

M. Gubanov, M. Priya, and M. Podkorytov. Cognitivedb: An intelligent navigator for large-scale dark structured data. In WWW, 2017, 5 pages.

M. Gubanov and A. Pyayt. Readfast: High-relevance search-engine for big text. In ACM CIKM, 2013, 3 pages.

M. Gubanov and A. Pyayt. Type-aware web search. In EDBT, 2014, 2 pages.

M. Gubanov and M. Stonebraker. Large-scale semantic profile extraction. In EDBT, 2014, 4 pages.

M. Gubanov and P. A. Bernstein. Structural text search and comparison using automatically extracted schema. In WebDB, 2006, 6 pages.

M. Hellerstein, C. Re, F. Schoppmann, D. Z. Wang, and E. Fratkin. Ruleminer: Data quality rules discovery. In PVLDB, 2012, 4 pages.

V. Iosifidis and E. Ntoutsi. Adafair: Cumulative fairness adaptive boosting. In CIKM, 2019, 10 pages.

R. Khan and M. Gubanov. Nested dolls: Towards unsupervised clustering of web tables. In IEEE Big Data, 2018, 3 pages.

Lukasz Golab, Howard Karlo and D. Srivastava. Data auditor: Exploring data quality and semantics using pattern tableaux. In PVLDB, 2010, 4 pages.

S. Melnik, E. Rahm, and P. A. Bernstein. Rondo: a programming platform for generic model management. In SIGMOD, 2003, 193-204.

F. Nargesian, K. Q. Pu, E. Zhu, B. G. Bashardoost, and R. J. Miller. Organizing data lakes for navigation. In SIGMOD'20, Jun. 14-19, 2020, 1939-1950.

A. S. Ori Bar El, Tova Milo. Automatically generating data exploration sessions using deep reinforcement learning. In SIGMOD'20, Jun. 14-19, 2020, 1527-1537.

S. Ortiz, C. Enbatan, M. Podkorytov, D. Soderman, and M. Gubanov. Hybrid.json: High-velocity parallel in-memory polystore json ingest. In IEEE Bigdata, 2017, 4807-4809.

M. Podkorytov and M. N. Gubanov. Hybrid.poly: Performance evaluation of linear algebra analytical extensions. In IEEE Big Data, 2018, 3 pages.

M. Simmons, D. Armstrong, D. Soderman, and M. Gubanov. Hybrid.media: High velocity video ingestion in an in-memory scalable analytical polystore. In IEEE Bigdata, 2017, 3 pages.

S. Soderman, A. Kola, M. Podkorytov, M. Geyer, and M. Gubanov. Hybrid.ai: A learning search engine for large-scale structured data. In WWW, 2018, 1507-1514.

M. Stonebraker, D. Abadi, and A. B et al. C-store: A column-oriented dbms. In VLDB, 2005, 12 pages.

S. M. Tamraparni Dasu, Theodore Johnson and V. Shkapenyuk. Mining database structure; or, how to build a data quality browser. In SIGMOD, 2002, 240-251.

P. S. Vamsi Meduri, Lucian Popa and M. Sarwat. A comprehensive benchmark framework for active learning methods in entity matching. In SIGMOD'20, Jun. 14-19, 2020, 1133-1147.

R. Wu, S. Chaba, S. Sawlani, X. Chu, and S. Thirumuruganathan. Zeroer: Entity resolution using zero labeled examples. In SIGMOD'20, Jun. 14-19, 2020, 1149-1164.

F. Zablith, B. Azad, and I. H. Osman. Catalyst: Piloting capabilities for more transparent text analytics. In AMCIS, 2017, 5 pages.

M. Zaharia. Apache Spark: a unified engine for big data processing. CACM, 2016, 56-65.

Y. Zhang and Z. G. Ives. Finding related tables in data lakes for interactive data science. In SIGMOD'20, Jun. 14-19, 2020 1951-1966.

* cited by examiner

| Songs | Attributes |
|---|---|
| | Artist,Title,Release Year,Label,Cat.No,Length,Tracks |
| | Song Title,Date Recorded,Time,Master# |
| | Track#,Track Title,Track Length,Track Price/Buy |
| | Name,Album,Time-,Price |
| | Song Title,dial-up,cable/dsl,Time |
| | Song Title,Year Released,Song Rank |

*FIG. 3*

Listing 1: Jobs query results

```
Q1: SELECT 'job_title',company,salary
    FROM Jobs
    WHERE 'job_title'
    LIKE '%Software_Engineer%'
    AND location LIKE '%Madison%'
    ORDER BY salary DESC
Results:
'job_title'                 'company'   'salary'
Software Engineer           Google      151400.00
Software Engineer II        Microsoft   140000.00
Senior Software Engineer    Percipenz   117000.00
Sr. Software Engineer       Onward      98000.00
```

*FIG. 5*

Listing 2: Songs query results

```
Q2: SELECT artist, title, url, price
    FROM Songs
    WHERE (artist LIKE '%Taylor_Swift%'
    OR artist LIKE '%Cut_Copy%')
    AND track_preview = 'Available'
    ORDER BY title, price DESC
Results:
'artist'        'title'              'url'                 'price'
Taylor Swift    I Knew You Were..    7digital.com          0.99
Taylor Swift    I Knew You Were..    ituneschart s.net/    1.29
Cut Copy        Strangers In Th..    7digital.com/         1.29
Cut Copy        Strangers In Th..    ituneschart s.net/    1.49
```

*FIG. 6*

SYSTEMS AND METHODS FOR INTERACTIVE LARGE-SCALE DATA SEARCH AND PROFILING

CROSS-REFERENCE TO RELATED APPLICATIONS

This application claims the benefit of U.S. provisional patent application No. 63/104,230, filed on Oct. 22, 2020, and titled "SYSTEMS AND METHODS FOR INTERACTIVE LARGE-SCALE DATA SEARCH AND PROFILING," the disclosure of which is expressly incorporated herein by reference in its entirety.

BACKGROUND

Data profiling includes statistical data analysis techniques that can be used to determine properties of a given dataset. Historically, many data profiling tasks were aimed at data. However, when a dataset has millions of tables, the table meta-data (i.e. titles, attribute names and types) becomes abundant similar to data instances and the profiling of the data starts to play a vital role. At scale, when a dataset has millions of tables, metadata of these tables becomes abundant and also requires profiling to remain useful for query processing, data integration, cleaning, and other metadata-dependent tasks. Therefore, what is needed are system and methods for performing data profiling on large datasets, including systems and methods for performing data profiling on datasets including large numbers of tables.

SUMMARY

Systems and methods for profiling a dataset are described herein.

An example computer-implemented method for profiling a dataset is described herein. The method can include grouping, using a machine learning classifier, a plurality of tables in a dataset that are associated with an object into a cluster, where each of the tables of the cluster includes respective data and respective metadata, the respective metadata including at least one respective attribute, generating a metadata-profile for the cluster, where the metadata-profile includes the at least one respective attribute of each of the tables of the cluster, and querying the cluster using the metadata-profile.

Optionally, the metadata-profile provides a summary of different representations of the object. Alternatively or additionally, the metadata-profile includes a name and a set of properties, where the set of properties includes the at least one respective attribute of each of the tables of the cluster.

Alternatively or additionally, the computer-implemented method includes generating display data for the metadata-profile. Optionally, the computer-implemented method includes displaying on a user interface the display data for the metadata-profile. In some implementations, the display data includes a visual representation of the at least one respective attribute of each of the tables of the cluster.

Alternatively or additionally, the machine learning classifier is a Logistic Regression (LR) classifier, a Naive Bayes (NB) classifier, a Deep Learning Neural Network (NN), or a majority voting ensemble.

In some implementations, the computer-implemented method includes grouping, using a plurality of machine learning classifiers, the plurality of tables in the dataset that are associated with the object into a plurality of clusters and generating a plurality of respective metadata-profiles for each one of the clusters. Alternatively or additionally, the computer-implemented method of includes generating display data for the respective metadata-profiles. Optionally, the computer-implemented method includes displaying on a user interface the respective metadata-profiles. In some implementations, the display data includes a visual representation of the respective metadata-profiles. Optionally, the computer-implemented method includes receiving a metadata-profile selection from among the respective metadata-profiles from a user.

A computer-implemented method for training a machine learning classifier is described herein. The computer-implemented method includes providing a dataset including a plurality of tables associated with a plurality of different objects, selecting a table from the plurality of tables in the dataset, where the selected table is associated with an object of interest, and where the selected table includes data and metadata, the metadata including a plurality of attributes, and training a machine learning classifier using the data and metadata of the selected table. The trained machine learning classifier is configured to group one or more of the plurality of tables in the dataset that are associated with the object of interest into a cluster.

Alternatively or additionally, the computer-implemented method includes sorting the dataset based on at least one of object or table size. Optionally, the machine learning classifier is a Logistic Regression (LR) classifier, a Naive Bayes (NB) classifier, a Deep Learning Neural Network (NN), or a majority voting ensemble.

A system for profiling a dataset is described herein. The system includes a distributed storage system configured to store a dataset comprising a plurality of tables associated with a plurality of different objects, at least one processor and a memory operably coupled to the at least one processor, where the memory has computer-readable instructions stored thereon. The system further includes a columnar storage module stored in the memory that, when executed by the at least one processor, is configured to store the tables of the dataset by column, a training data generation module stored in the memory that, when executed by the at least one processor, is configured to produce a training dataset, a machine learning classifier training module stored in the memory that, when executed by the at least one processor, is configured to train a machine learning classifier using the training data set. The system also includes a classification module stored in the memory that, when executed by the at least one processor, is configured to group, using the trained machine learning classifier, one or more of the plurality of tables in the dataset that are associated with an object into a cluster and a metadata-profile module stored in the memory that, when executed by the at least one processor, is configured to generate a metadata-profile for the tables of the cluster.

Optionally, the columnar storage module is a parallel column store.

Alternatively or additionally, the system includes a user interface configured to receive a query from a user.

Optionally, the machine learning classifier is a Logistic Regression (LR) classifier, a Naive Bayes (NB) classifier, a Deep Learning Neural Network (NN), or a majority voting ensemble.

Alternatively or additionally, the machine learning classifier is further configured to train a plurality of machine learning classifiers using the training data set.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 3 is a table illustrating different representations of attributes of an object (e.g., Songs).

FIG. 4A illustrates non-limiting example attributes of songs, FIG. 4B illustrates non-limiting example attributes of job listings, and FIG. 4C illustrates non-limiting example attributes of books.

FIG. 5 illustrates a non-limiting example of a listing of job query results.

FIG. 6 illustrates a non-limiting example of a listing of song query results.

DETAILED DESCRIPTION

Figure 1:
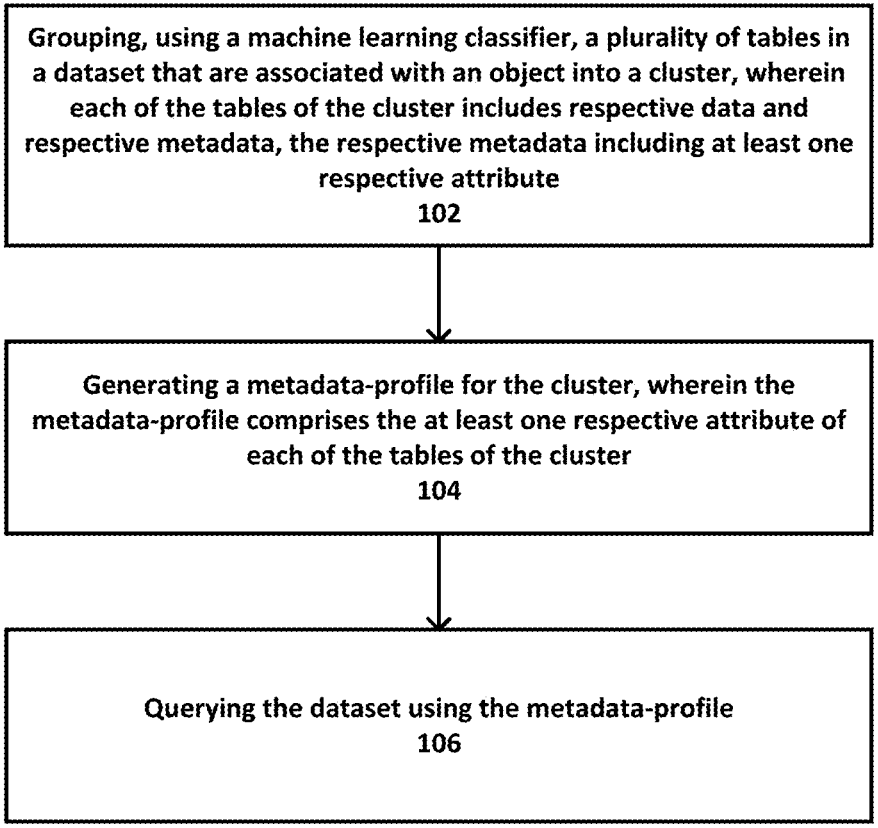
FIG. 1 is a flowchart illustrating a method of profiling and querying a dataset, according to one implementation described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for data profiling of specific types of data (e.g. lists of songs, lists of job openings), it will become evident to those skilled in the art that the implementations are not limited thereto, but are applicable for profiling any type of structured data. It should be understood that throughout the present disclosure the term "structured data" can refer to both "structured data" and "semi-structured data." For example, it should be understood that methods of clustering and profiling data described herein in relation to structured datasets can also be applied to semi-structured datasets.

Systems and methods are disclosed for performing data profiling on large-scale structured data sets. Data profiling is a fundamental data management activity involving statistical data analysis to determine properties of a given dataset [3, 4, 11-17, 20, 25-28]. Data profiling is becoming increasingly important with continuing emergence of a variety of large-scale datasets. At scale, data becomes "dark" [6, 9, 33]—i.e. it is difficult to understand the actual contents of the dataset and its critical characteristics such as metadata. Metadata (e.g. table titles, attribute names and types) can be very important for structured data. Metadata can affect the most fundamental tasks with structured data such as query processing, data integration and cleaning as well as other important derivatives such as search, classification, and clustering.

The present disclosure makes reference to using machine learning techniques to group a plurality of tables in a dataset. It should be understood that the machine learning techniques implemented in the present disclosure can include supervised learning models such as artificial neural networks (ANN) or other machine learning techniques including, but not limited to a Logistic Regression (LR) classifier, a Naive Bayes (NB) classifier, or an ensemble (e.g., majority voting ensemble).

A LR classifier is a supervised classification model that uses the logistic function to predict the probability of a target, which can be used for classification. LR classifiers are trained with a data set (also referred to herein as a "dataset") to minimize the cost function, which is a measure of the LR classifier's performance (e.g., error such as L1 or L2 loss) during training. This disclosure contemplates that any algorithm that finds the minimum of the cost function can be used for training. LR classifiers are known in the art and are therefore not described in further detail herein.

An NB classifier is a supervised classification model that is based on Bayes' Theorem, which assumes independence among features (i.e., presence of one feature in a class is unrelated to presence of any other features). NB classifiers are trained with a data set by computing the conditional probability distribution of each feature given label and applying Bayes' Theorem to compute the conditional probability distribution of a label given an observation. NB classifiers are known in the art and are therefore not described in further detail herein.

An majority voting ensemble is a meta-classifier that combines a plurality of machine learning models for classification via majority voting. In other words, the majority voting ensemble's final prediction (e.g., class label) is the class label predicted most frequently by the ensemble member models. Majority voting ensembles are known in the art and are therefore not described in further detail herein.

An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers such as input layer, output layer, and optionally one or more hidden layers. An ANN having hidden layers can be referred to as deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tanH, or rectified linear unit (ReLU) function), and provide an output in accordance with the activation function. Additionally, each node is associated with a respective weight. ANNs are trained with a data set to minimize the cost function, which is a measure of the ANN's performance (e.g., error such as L1 or L2 loss) during training. The training algorithm tunes the node weights and/or bias to minimize the cost function. This disclosure contemplates that any algorithm that finds the minimum of the cost function can be used for training the ANN. Training algorithms for ANNs include, but are not limited to, backpropagation. Optionally, the machine learning technique is a deep learning model. Machine learning models are known in the art and are therefore not described in further detail herein.

It should be understood that LR classifiers, NB classifiers, majority voting ensembles, and ANNs are provided only as examples. This disclosure contemplates that the machine learning techniques may be other supervised learning models, semi-supervised learning models, or unsupervised learning models. Implementations of the present disclosure can include machine learning classifiers. Non-limiting examples of machine learning classifiers include logistic regression classifiers, k-nearest neighbor classifiers, case-based reasoning, decision trees, naïve Bayes classifiers, and neural network based classifiers, such as multilayer perceptrons. It should be understood that these machine learning classifiers are intended only as examples, and the use of other types of classifier are contemplated by the present disclosure.

Historically, many data profiling activities were aimed at gathering statistics on data-discovering candidate keys, functional dependencies, constraints, anomalies, data cleaning rules, and other instance-based discoveries. For example, references [3] and [4] identify goals and introduce a classification of data profiling capabilities of more than five recent research prototypes and ten commercial data profiling tools [1, 18, 19, 21, 30].

Figure 2:
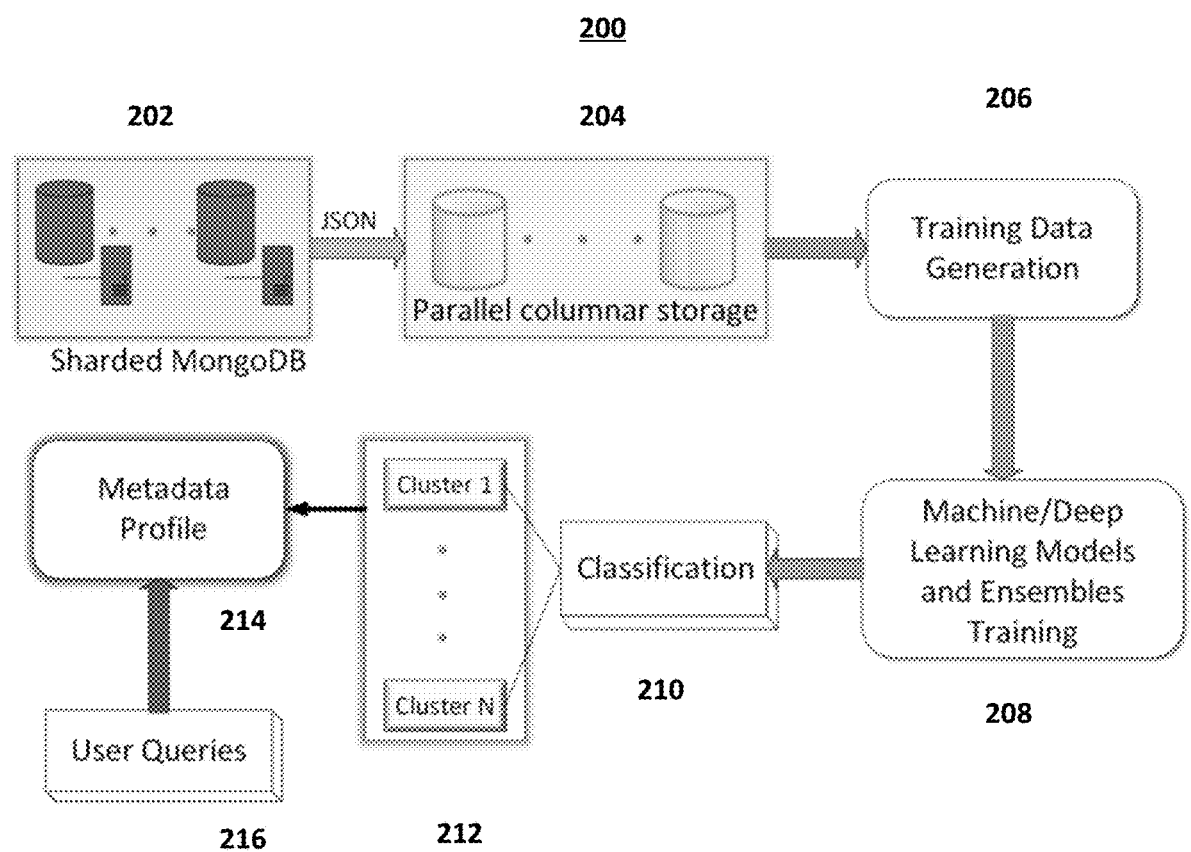
FIG. 2 is an architecture diagram, according to one implementation described herein.

FIG. 1 illustrates a flowchart of a method 100 according to one implementation described herein. In some implementations, the method 100 can be implemented using a specialized computer architecture, as shown in FIG. 2. This disclosure contemplates that the method 100 can be implemented using other computer architectures in other implementations. At step 102, the plurality of tables are grouped into a cluster associated with an object using a machine learning classifier, where each of the tables in the cluster can include data and metadata. The tables can be part of a structured or semi-structured data set. As described herein, the metadata can include one or more attributes. Non-limiting examples of objects are songs, jobs, and books. It should be understood that different tables (sources) in a structured data set are associated with different objects. Non-limiting examples of attributes for three different objects ("songs," "jobs," and "books") can be seen in FIG. 3 and FIGS. 4A-4C. Note that the types of objects and/or attributes for objects described herein are only intended as non-limiting examples, and that the use of any type of structured data is contemplated.

The machine learning classifier can be a Logistic Regression classifier, a Naive Bayes classifier, a deep learning neural network, and/or a majority voting ensemble. It should be understood that other types of machine learning classifiers can be trained and used with the implementations described herein. In the examples described herein, a "classifier" assigns class labels to tables in the dataset. These class labels can correspond to the "clusters" referred to throughout the present disclosure. By configuring the classifier, implementations of the present disclosure can be configured to group tables into the same cluster, or into different clusters, as described below. Similarly, the present disclosure contemplates that different types of classification can be performed including binary classification, multi-class classification, multi-label classification, and imbalanced classification.

Further, in some implementations, tables can be grouped into a set of clusters using more than one machine learning classifier. For example, in some implementations, one or more machine learning classifiers can be used to group different objects together (e.g., classify tables associated with songs, jobs, books, etc.). Thereafter, different machine learning classifiers can be used to group tables associated with the same object (e.g., songs) into different clusters. Alternatively, machine learning classifiers can be used to group tables associated with the different object (e.g., songs, jobs, books) into different clusters.

At step 104, the metadata-profile for the cluster can be generated. In implementations with a plurality of metadata-profiles, the metadata-profiles for each one of the clusters can be generated. A metadata-profile can include the attribute or attributes of each of the tables of the cluster. In some implementations, the metadata-profile can include a name and a set of properties, and the set of properties can include the attribute or attributes of each of the tables of the cluster. The metadata-profile can therefore provide a summary of different representations of the object (e.g., songs, jobs, books). Optionally, the metadata-profile (e.g. the profiles shown in FIGS. 4A-4C) can be produced by taking weighted attributes in the cluster and applying a data cleaning and/or enrichment algorithm. As a non-limiting example, a weakly-supervised data cleaning and/or enrichment algorithm can be used. Such algorithms may improve the quality of the attributes in the cluster, for example, by removing inaccurate or unreasonable attributes generated at step 104. Furthermore, it is contemplated by the present disclosure that the weighted attribute can be weighted for popularity, probability, or any other characteristic.

At step 106, the dataset can be queried using the metadata-profile. Throughout the present disclosure "query" refers to a request to a database to access data. The data that is "queried" from the database can be copied from the database, and/or manipulated. A query to a database can be performed using any of the database query systems or languages that are suitable for the dataset. As one example, the query can be performed using a SQL query language for structured datasets. FIGS. 5 and 6 are non-limiting examples of queries of an example structured dataset according to one non-limiting example implementation of the present disclosure. Alternatively, for semi-structured datasets, a query language suitable for semi-structured data such as XQuery or JSON can be used for the query. A listing can be created in response to the query, and the listing can be any representation of data that is responsive to the query. For example, FIGS. 5 and 6 illustrate non-limiting examples of data generated by one embodiment of the present disclosure in response to queries with job listings (FIG. 5) and song information (FIG. 6).

Figure 7:
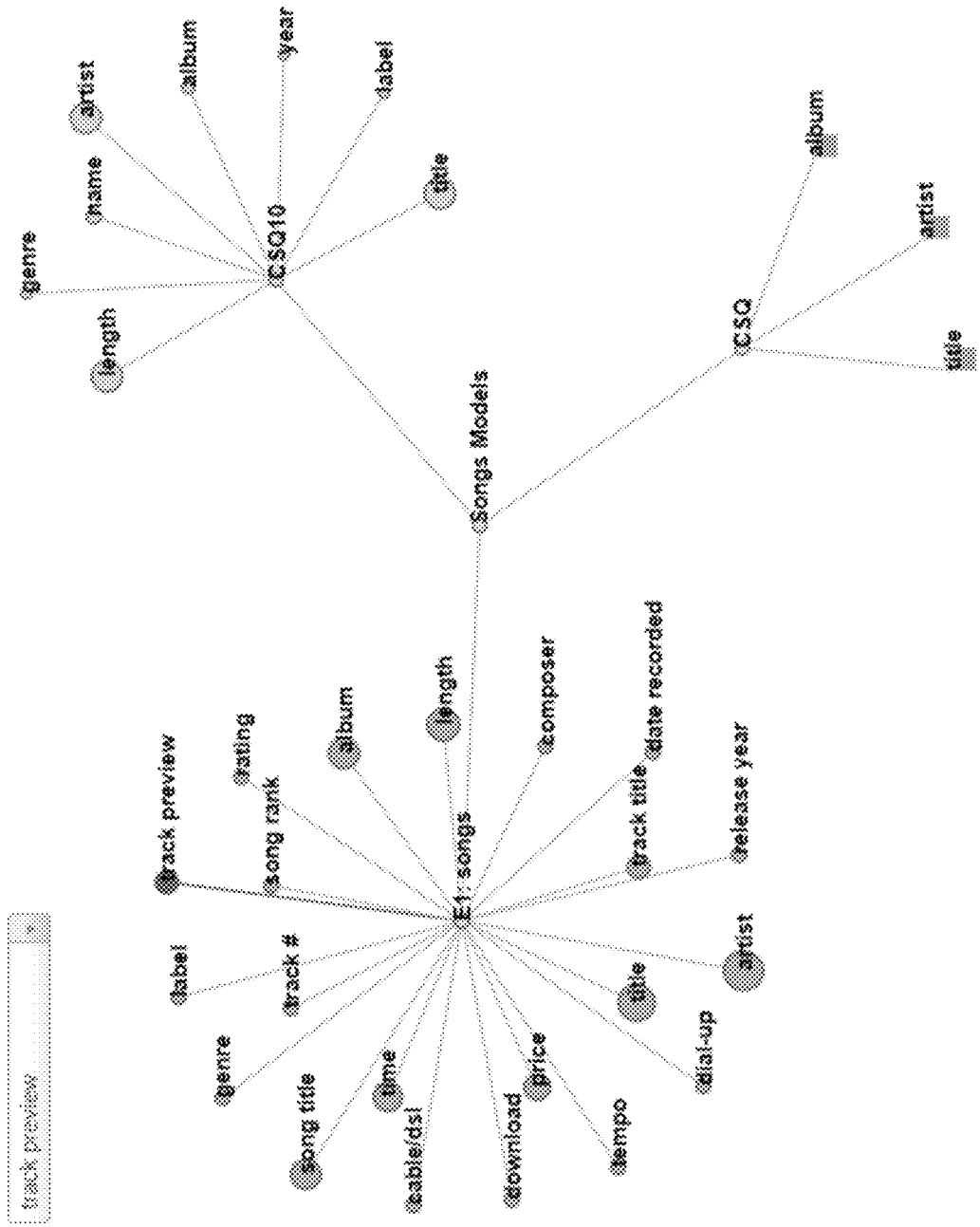
FIG. 7 illustrates a comparison of crowd-sourced profiles for songs to the profiles for songs generated by an implementation described herein.

In some implementations, the information from steps 102 and 104 (e.g., the metadata-profile and/or results of the query) can be displayed to a user. According to an implementation described herein, display data for the metadata-profile for the cluster can be generated. Further, the display data representing the metadata-profile for the cluster can be displayed to a user. According to an implementation described herein, the display data can include visual representations of the one or more attributes of each of the tables in the cluster (FIG. 7). FIG. 7 illustrates a non-limiting example of a comparison of a metadata-profile generated using the method 100 of FIG. 1 and metadata-profiles generated by crowd sourcing. The metadata profile illustrated in FIG. 7 is for songs, but it should be understood that implementations of the present disclosure can be used for different types of data. Other non limiting examples of types of data that can be represented as metadata profiles include information about cars, patents, jobs, restaurants, books, movies, and universities. It should also be understood that different implementations of the present disclosure can yield different representations of the same data. For example, implementations of the present disclosure including different classifiers, or different data sets can represent the same type of data in different ways.

Alternatively or additionally, the display data can include data for the metadata-profiles for each one of multiple clusters. For example, this disclosure contemplates that the visual representation can include different metadata-profiles for different clusters for the same object. This disclosure also contemplates that the visual representation can include different metadata-profiles for different clusters for the different object. A user can select a metadata-profile to use for the query using such visual representations. The display data including data for the metadata-profiles can be displayed on a user interface.

According to some implementations of the present disclosure, the method 100 further includes maintaining a structured dataset, where the structured dataset includes metadata-tables associated with different objects. It should be understood that the tables in a large structured dataset include tables associated with different objects (e.g., songs, jobs, books). The machine learning classifiers described herein are used to group (e.g., cluster) tables that are associated with specific objects together such that metadata-profiles can be generated.

With reference to FIG. 2, a computer architecture 200 is illustrated in accordance with an implementation of the present disclosure. The dataset can be stored in sharded database 202 (e.g., MongoDB, which is a scalable distributed JSON storage). The use of other scalable distributed storage systems is contemplated by the present disclosure. The data from MongoDB (e.g., data in JavaScript Object Notation (JSON) format) can be converted and ingested into a parallel column store 204 for further efficient query processing. Column stores are efficient in processing the queries having selection conditions on columns, and this can be a workload pattern for sampling and training data generation queries in implementations described herein [29]. The training data generation module 206 is configured for selection queries, slicing the dataset by source, sets of attributes, patterns, in order to produce the training sets for the next step. The Machine/Deep Learning training module 208 and the Classification module 210 are configured for training the models, for example, using Spark [34] and TensorFlow [2] and further classification of the dataset using these models, respectively. It should be understood that Spark [34] and TensorFlow [2] are provided only as example machine learning engines. The classification step in FIG. 2 produced n clusters 212, where each cluster 212 corresponds to a specific object that a model was trained to recognize (e.g. Songs). In a clustered dataset 212, each cluster can subsume a variety of sources. These clusters can be used to generate rich Metadata-profiles 214 (e.g. one per cluster). The system 200 can receive user queries 216 from users and query the dataset based on the user queries and Metadata-profile 214.

The variety of metadata as well as volume, pose significant challenges to high quality metadata profiling. In large-scale structured datasets, composed from millions of sources, the same real-world object (e.g. Songs) can be represented very differently, depending on the creator of the source. Implementations described herein include an abstraction, the "Metadata-Profile" which can summarize different representations of the same real-world object. Further, implementations described herein include a system for constructing such profiles at scale. These profiles can help data scientists and end users gain access to some or all relevant data sources.

A user study is described below with 20 students. The user study found that an implementation of the present disclosure (described herein as "WebLens") was highly efficient compared to crowd-souring with 20 people. A Metadata-Profile in accordance with an implementation described herein is further described below. Also described herein are systems and methods for profile construction, evaluation, and several interactive demonstration scenarios.

"WebLens" is an interactive, scalable metadata profiler for large-scale structured data. A data structure, the "Metadata-profile" can be coupled with Machine/Deep-Learning models trained to construct the Metadata-profile. The Metadata-profile can represent a meta-data summary of a specific real-world object collected over millions of data sources. Such profiles can significantly simplify access to largescale structured datasets for both data scientists and end users.

Throughout the present disclosure, the terms "Metadata-Profile," "MP" and "profile" are used to refer to a data structure summarizing different representations of the same object O. More abstractly an MP can be represented by a tuple MP=(Name, Prop). The Name can be a unique name for the MP, such that Name E Namespace, where Namespace is a name space of object names (e.g. a set of strings). The term "Prop" can represent a set of properties for the MP such that $\{p1 \ldots pn\}$, where $\forall pi \in Prop: i=\{1, \ldots, n\}$, and $pi=(PName_i, PType_i, P_i, PF_i)$. Further, $PName_i$ can be a unique name of the property: $PName \in PNamespace$, where PNamespace is a name space of property names (a set of strings). $PType_i$ can be its plain data type (e.g. int, float, string, etc.): $PType_i \in Plaintypes$, where Plaintypes is a set of plain/non-composite data types (e.g. int, float, string, etc.). $P_i: 0 < P_i \leq 1$ is the probability of pi to be in a randomly sampled representation of O. If $Rep_O$ is the total number of available different representations for O, $Rep_O^{pi}$—the number of such representations where pi is present, then $P_i = Rep_O^{pi}/Rep_O$. FIG. 3 illustrates a non-limiting example of six different representations of Songs object. Here the probability of Song title property is 3/6=50%, for Length it is 2/6≈33%.

Profile construction can be very inefficient with crowd-sourcing. Using WebLens, several models, including an ensemble, were trained for this task. All of them have not only table metadata, but also instances (tuples) as components of the training data feature vector. This can help models identify similar objects by data instances, not only metadata.

An implementation described herein trains regular Machine Learning classifiers: Logistic Regression (LR), Naive Bayes (NB), a Deep Learning Neural Network (NN), and a majority voting ensemble $E_1$. Via 10-fold cross-validation LR precision ranging from 92.5% (for Movies) to 100% (Cars) is observed. Further, recall ranging from 89.1% (Movies) to 100% (Cars) and F-measure ranging from 90.8% (Movies) to 100% (Cars) is observed. For 111B precision ranging from 87.9% (Movies) to 98.2% (Cars) is observed and, recall ranging from 94.4% (Movies) to 100% (Cars, Patents, Jobs, Restaurants, Universities) and F-measure ranging from 91% (Movies) to 99% (Cars, Restaurant) is observed. For NN precision ranging from 76.8% (for Books) to 94.9% (Patents) is observed and, recall ranging from 76.3% (Books) to 92.2% (Patents) and F-measure ranging from 76.5% (Books) to 93.5% (Patents) is observed. For $E_1$ precision ranging from 89% (for Movies) to 99.8% (Patents, Restaurants, Universities) is observed, and recall ranging from 90.5% (for Movies) to 100% (Patents, Restaurants, Universities) is observed. Using an implementation described herein, the average 10-fold cross-validation F-measure for all objects trained using LR was 98.9%, using NB is 97.3%, using NN s 86.1% and using $E_1$ is 98.2%. The LR and NB were trained on Spark [34] using SparkML. NN is a multi-layer perceptron with the layers stacked sequentially, the first layer being an embedding layer, followed by two dense layers. Global average pooling was used with the activation functions relu, sigmoid. The models were trained using TensorFlow [2] and Keras API[8]. The machine learning architectures, training systems, and measurements described with respect to "WebLens" are intended only as non-limiting examples.

The positively labeled training data can be generated by manually selecting one large table in a large source having objects of interest (e.g. kfai.org for Songs). This table can have just one representation of the object. The sizes of the source and the table are important to ensure there is enough training data. Negative training data of the same size (to ensure the training set is balanced) can be drawn uniformly at random from the remaining sources. This approach can be less effective if the object is heavily represented in the dataset (e.g. there are mostly Songs and not too many other objects). This is generally rare for Web scale datasets composed from millions of sources. The training data instance vector has two features: the attribute names and the actual data values. The attributes can be taken the table schema directly (i.e. not inferred from the data).

According to some implementations described herein, a user interface can display alternative clusters that can be used to query the dataset. For example, a user who is interested in querying the data for a specific attribute or specific attributes can use the user interface to select the cluster that best represents the attribute or attributes that the user is interested in.

Example 1

A user study with 20 students was performed, which found that WebLens trained models significantly outperform the 20 people on the task of construction of metadata-profiles for 10 objects from different domains.

For demonstration and evaluation a large-scale dataset of ≈15 Million relational English tables from the Web was used. FIG. 3 illustrates the representations of the same object in a large-scale structured dataset even for a small sample of six. Furthermore, as the sample grows, the variety of representations increases, it can become very difficult for a person (or a team) to guess these representations and gain access to all relevant data. To gauge the difficulty, a user study was conducted where 20 students tried to guess the representations (sets of attributes) for ten objects (Songs, Jobs, Universities, etc.). The guesses were averaged per object over all subjects and per subject over all objects to generalize the results. The results suggested that one person can reliably guess only a few attributes out of 10-100 available, which leads to losing access to sources with the remaining attributes.

For each person studied, the average number of different attributes guessed and retrieved was ranging between 0 and 3.4; the average number of different object representations was between 0 and 0.6; the average number of new sources between 0 and 2.8. All these averages are over 10 objects for each person.

For each object, the average number of different attributes guessed and retrieved varied from 3 to 11; the average number of different sources and representations from 0 to 1.9. All these averages are over unions of results of 10 queries composed by 10 people. From this user study, it can be inferred that everyone has a certain concept of an object in mind, different from what other people have, which makes it difficult to guess. Getting all attributes that all sources have for an object, proved to be completely out of reach for the users studied. There are more than 50 different attributes in Songs profile constructed by WebLens from our dataset, but 10 people collectively came up with only 11 Songs attributes and it was even less for other objects. Therefore it can be inefficient to use crowd-sourcing for Metadata-profile construction.

One dataset that was used to test an implementation of the present disclosure included more than 15 million relational English Web tables coming from more than 248,000 Web sources in English. Each table had on average five attributes and ten tuples. There are a few tables with more than 30 attributes and 100 tuples. The attributes usually consist one term, sometimes of two to five terms, each tuple having 15 terms on average. There are few larger objects such as Patents having 50-100 terms per tuple on average.

Figure 4A:
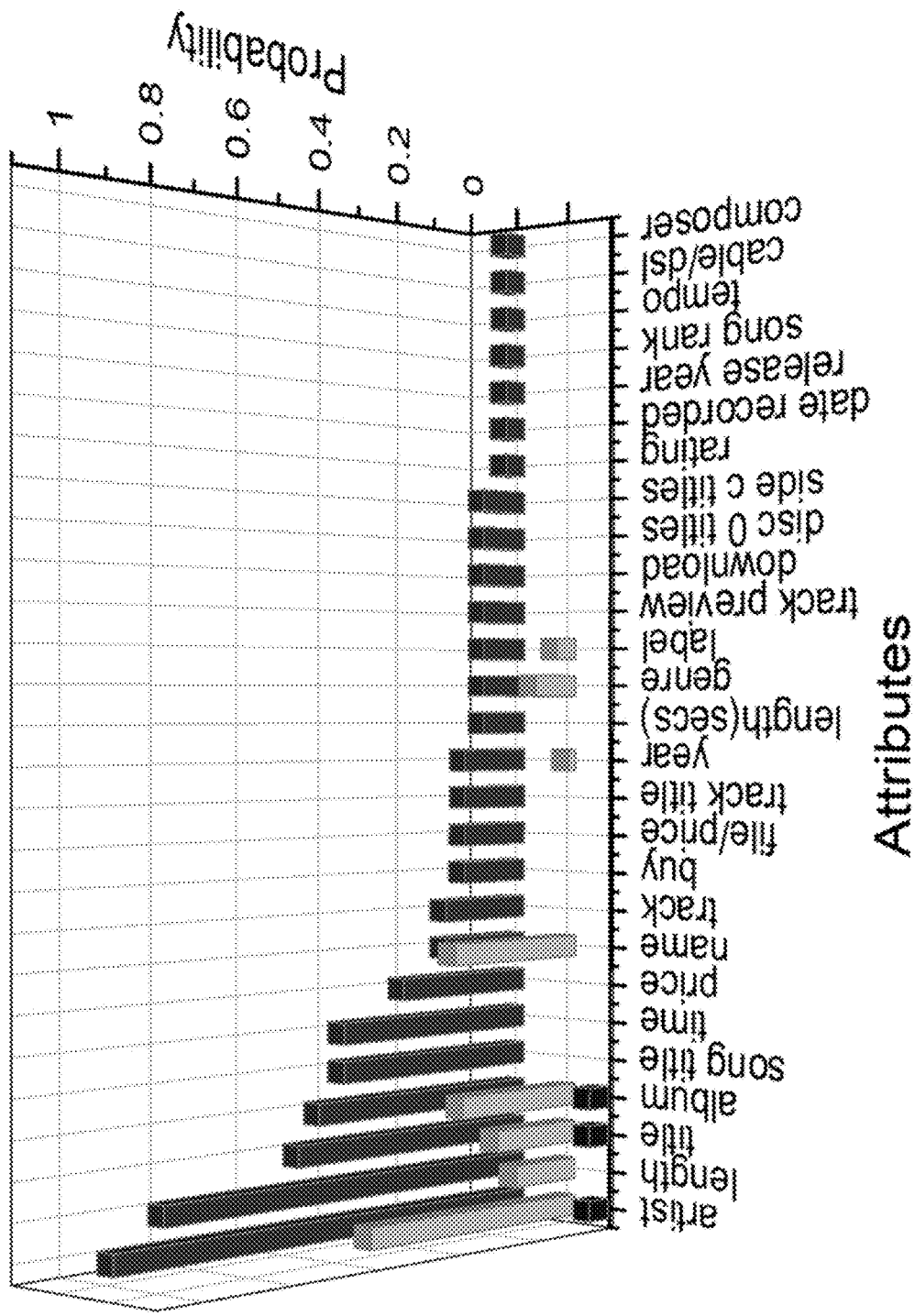
FIGS. 4A-4C illustrate bar charts showing metadata profiles for songs, jobs, and books, wherein the front two lines of bars illustrate the probability of each attribute being present in crowd-sourced profiles, and the rearmost line of bars illustrates the probability that the attribute will be present in the profile created by an implementation described herein.
Figure 4C:
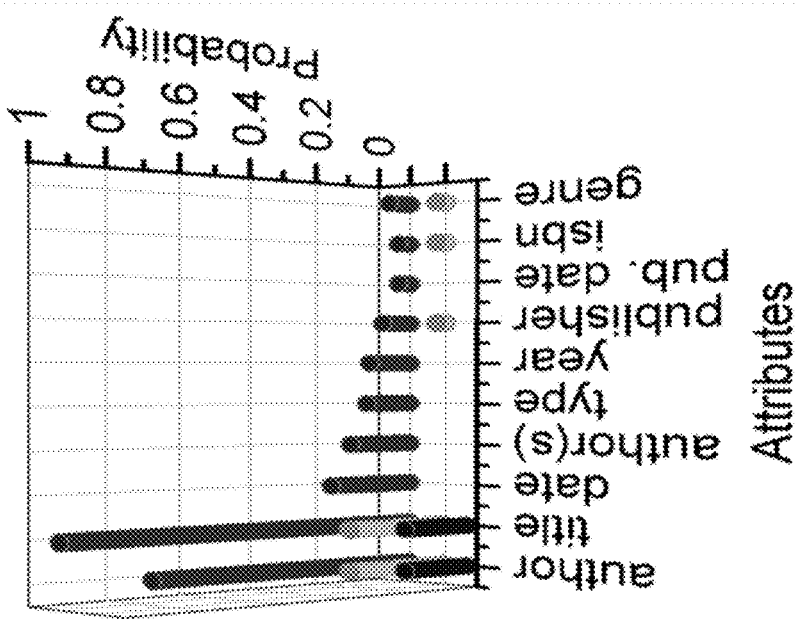
Figure 4B:
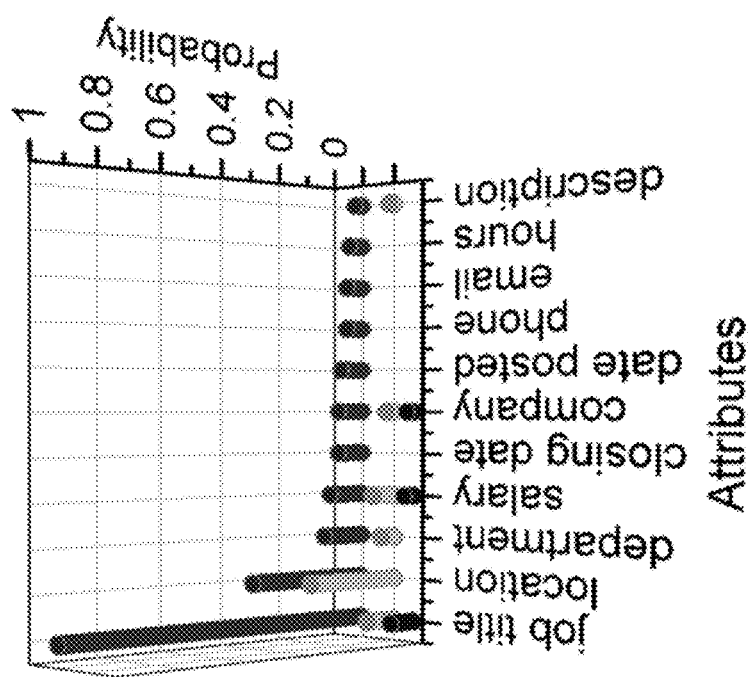

FIGS. 4A-4C illustrates the profiles generated by WebLens for Songs, Books, and Jobs. The third row (the furthest back) is the WebLens profile, the first and second rows are the profiles produced by one or ten people respectively. As shown in FIGS. 4A-4C, WebLens produces much richer profiles compared to crowd-sourcing.

Example 2

Described herein are two non-limiting examples of queries that an end user can run on the profiles constructed by WebLens (i.e. Jobs and Songs, see FIGS. 4A-4C). The query can be developed by looking at the attributes in the profile, it is executed against the clusters of objects formed by WebLens.

Example 2 Scenario 1: In $Q_1$ the end user is trying to find a software engineering job in Madison with the highest salary by querying the Jobs WebLens cluster. The query and the results below are illustrated in FIG. 5. The Jobs cluster is composed from thousands of jobs data sources found by WebLens, so the user can have a higher chance to find the best posting, as compared to manual querying of the original unclustered dataset. An example of a Jobs query result is shown in FIG. 5. It should be understood that querying can be performed in any suitable query language, and that the format and results of the queries illustrated in FIGS. 5 and 6 are intended only as non-limiting examples. For example, implementations described herein can use SQL, XQuery, JSON, or any other suitable query language.

Example 2 Scenario 2:Q2 returns the Web sites having songs by "Taylor Swift" and "Cut Copy" sorted by the price with the track preview feature. Using this query, the user can find the Web sites that allow to preview the track before buying, and at the same time select the best deal among them. The Songs profile in FIG. 4A shows that the attribute "track preview" is rare. Further, not identified by any of the crowd-sourcing efforts from the user study described below (front two lines of bars in the bar chart), whereas WebLens found this attribute and its sources hence enabled such queries.

Example 2 Scenario 3: The interactive Metadata-profile browser for Songs is illustrated in FIG. 7. WebLens has a similar interface for each profiled object in the system. It visualizes two crowd-sourced profiles (CSQ/CSQ10—created by one person or a team of ten) and a profile generated by WebLens (i.e. $E_1$ ensemble). The profile, created by WebLens is much richer, and therefore can produce more query results if used as a query interface.

The interface also supports source-search by attribute name. I.e. a user can type in track preview in the edit box on top, which would highlight the matching attributes. Clicking on the attribute can redirect to the original Web source (i.e. where the attribute comes from). This can be useful for data scientists or end users looking for sources with specific attributes.

Example Computing Device

It should be appreciated that the logical operations described herein with respect to the various figures may be implemented (1) as a sequence of computer implemented acts or program modules (i.e., software) running on a computing device (e.g., the computing device described in FIG. 8), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 8:
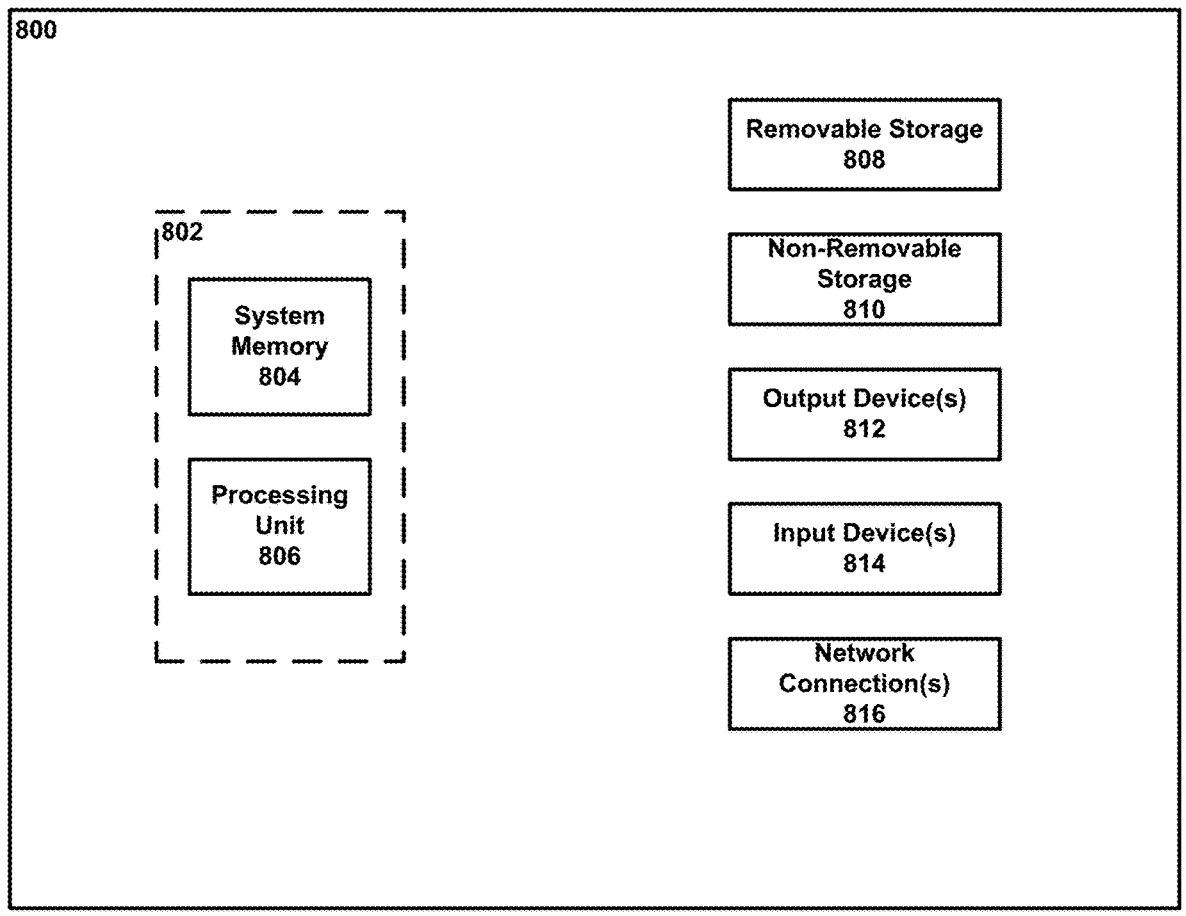
FIG. 8 illustrates an example computing device.

Referring to FIG. 8, an example computing device 800 upon which the methods described herein may be implemented is illustrated. It should be understood that the example computing device 800 is only one example of a suitable computing environment upon which the methods described herein may be implemented. Optionally, the computing device 800 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 800 typically includes at least one processing unit 806 and system memory 804. Depending on the exact configuration and type of computing device, system memory 804 may be volatile (such as random access memory (RAM)), non-volatile (such as read-only memory (ROM), flash memory, etc.), or some combination of the two. This most basic configuration is illustrated in FIG. 5 by dashed line 802. The processing unit 806 may be a standard programmable processor that performs arithmetic and logic operations necessary for operation of the computing device 800. The computing device 800 may also include a bus or other communication mechanism for communicating information among various components of the computing device 800.

Computing device 800 may have additional features/functionality. For example, computing device 800 may include additional storage such as removable storage 808 and non-removable storage 810 including, but not limited to, magnetic or optical disks or tapes. Computing device 800 may also contain network connection(s) 816 that allow the device to communicate with other devices. Computing device 800 may also have input device(s) 814 such as a keyboard, mouse, touch screen, etc. Output device(s) 812 such as a display, speakers, printer, etc. may also be included. The additional devices may be connected to the bus in order to facilitate communication of data among the components of the computing device 800. All these devices are well known in the art and need not be discussed at length here.

The processing unit 806 may be configured to execute program code encoded in tangible, computer-readable media. Tangible, computer-readable media refers to any media that is capable of providing data that causes the computing device 800 (i.e., a machine) to operate in a particular fashion. Various computer-readable media may be utilized to provide instructions to the processing unit 806 for execution. Example tangible, computer-readable media may include, but is not limited to, volatile media, non-volatile media, removable media and non-removable media implemented in any method or technology for storage of information such as computer readable instructions, data structures, program modules or other data. System memory 804, removable storage 808, and non-removable storage 810 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 806 may execute program code stored in the system memory 804. For example, the bus may carry data to the system memory 804, from which the processing unit 806 receives and executes instructions. The data received by the system memory 804 may optionally be stored on the removable storage 808 or the non-removable storage 810 before or after execution by the processing unit 806.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

REFERENCES

[1] Informatica. https://www.informatica.com/.
[2] M. Abadi. TensorFlow: Large-scale machine learning on heterogeneous systems, 2015. Software available from tensorflow.org.
[3] Z. Abedjan. Data profiling. In *Encyclopedia of Big Data Technologies*. 2019.
[4] Z. Abedjan, L. Golab, F. Naumann, and T. Papenbrock. *Data Profiling*. Synthesis Lectures on Data Management. Morgan & Claypool, 2018.
[5] M. J. Cafarella, A. Halevy, D. Z. Wang, E. Wu, and Y. Zhang. Webtables: exploring the power of tables on the web. VLDB, 2008.
[6] M. J. Cafarella, I. F. Ilyas, M. Kornacker, T. Kraska, and C. Re. Dark data: Are we solving the right problems? In *ICDE*, 2016.
[7] Z. Chen, Q. Chen, B. Hou, Z. Li, and G. Li. Towards interpretable and learnable risk analysis for entity resolution. In *SIGMOD*, 2020.
[8] F. Chollet. Keras. https://keras.io, 2015.
[9] P. Cudré-Mauroux. Leveraging knowledge graphs for big data integration: the XI pipeline. Semantic Web, 11(1): 13-17, 2020.
[10] Gentile, A. Lisa, P. Ristoski, S. Eckel, D. Ritze, and H. Paulheim. Entity matching on web tables: a table embeddings approach for blocking. In *EDBT*, 2017.
[11] M. Gubanov. Hybrid: A large-scale in-memory image analytics system. In CIDR, 2017.
[12] M. Gubanov. Polyfuse: A large-scale hybrid data fusion system. In *ICDE*, 2017.
[13] M. Gubanov, M. Priya, and M. Podkorytov. Cognitivedb: An intelligent navigator for large-scale dark structured data. In *WWW*, 2017.
[14] M. Gubanov and A. Pyayt. Readfast: High-relevance search-engine for big text. In *ACM CIKM*, 2013.
[15] M. Gubanov and A. Pyayt. Type-aware web search. In *EDBT*, 2014.
[16] M. Gubanov and M. Stonebraker. Large-scale semantic profile extraction. In *EDBT*, 2014.
[17] M. N. Gubanov and P. A. Bernstein. Structural text search and comparison using automatically extracted schema. In *WebDB*, 2006.
[18] J. M. Hellerstein, C. Re, F. Schoppmann, D. Z. Wang, and E. Fratkin. Ruleminer: Data quality rules discovery. In *PVLDB*, 2012.
[19] V. Iosifidis and E. Ntoutsi. Adafair: Cumulative fairness adaptive boosting. In *CIKM*, 2019.
[20] R. Khan and M. Gubanov. Nested dolls: Towards unsupervised clustering of web tables. In *IEEE Big Data*, 2018.
[21] F. K. Lukasz Golab, Howard Karlo and D. Srivastava. Data auditor: Exploring data quality and semantics using pattern tableaux. In *PVLDB*, 2010.
[22] S. Melnik, E. Rahm, and P. A. Bernstein. Rondo: a programming platform for generic model management. In *SIGMOD*, 2003.
[23] F. Nargesian, K. Q. Pu, E. Zhu, B. G. Bashardoost, and R. J. Miller. Organizing data lakes for navigation. In *SIGMOD*, 2020.
[24] A. S. Ori Bar El, Tova Milo. Automatically generating data exploration sessions using deep reinforcement learning. In *SIGMOD*, 2020.
[25] S. Ortiz, C. Enbatan, M. Podkorytov, D. Soderman, and M. Gubanov. Hybrid.json: High-velocity parallel in-memory polystore json ingest. In *IEEE Bigdata*, 2017.
[26] M. Podkorytov and M. N. Gubanov. Hybrid.poly: Performance evaluation of linear algebra analytical extensions. In *IEEE Big Data*, 2018.
[27] M. Simmons, D. Armstrong, D. Soderman, and M. Gubanov. Hybrid.media: High velocity video ingestion in an in-memory scalable analytical polystore. In *IEEE Bigdata*, 2017.
[28] S. Soderman, A. Kola, M. Podkorytov, M. Geyer, and M. Gubanov. Hybrid.ai: A learning search engine for large-scale structured data. In *WWW*, 2018.
[29] M. Stonebraker, D. Abadi, and A. B. et al. C-store: A column-oriented dbms. In *VLDB*, 2005.
[30] S. M. Tamraparni Dasu, Theodore Johnson and V. Shkapenyuk. Mining database structure; or, how to build a data quality browser. In *SIGMOD*, 2002.
[31] P. S. Vamsi Meduri, Lucian Popa and M. Sarwat. A comprehensive benchmark framework for active learning methods in entity matching. In SIGMOD, 2020.
[32] R. Wu, S. Chaba, S. Sawlani, X. Chu, and S. Thiruruganathan. Zeroer: Entity resolution using zero labeled examples. In *SIGMOD*, 2020.

[33] F. Zablith, B. Azad, and I. H. Osman. Catalyst: Piloting capabilities for more transparent text analytics. In AMCIS, 2017.

[34] M. Zaharia. *Apache Spark: a unified engine for big data processing*. CACM, 2016. G. Ives. Finding related tables in data lakes for interactive data.

[35] Y. Zhang and Z. G. Ives. Finding related tables in data lakes for interactive data science. In SIGMOD, 2020. e. In *SIGMOD*, 2020.

What is claimed:

1. A computer-implemented method for profiling a dataset, comprising: grouping, using a machine learning classifier, a plurality of tables in a dataset that are associated with an object into a cluster, wherein each of the plurality of tables of the cluster includes respective data and respective metadata, the respective metadata including at least one respective attribute;
  generating a metadata-profile for the cluster, wherein the metadata-profile comprises the at least one respective attribute of each of the plurality of tables of the cluster;
  querying the cluster using the metadata-profile to obtain a plurality of query results;
  and outputting the plurality of query results for display.

2. The computer-implemented method of claim 1, wherein the metadata-profile provides a summary of different representations of the object.

3. The computer-implemented method of claim 1, wherein the metadata-profile comprises a name and a set of properties, wherein the set of properties includes the at least one respective attribute of each of the tables of the cluster.

4. The computer-implemented method of claim 1, further comprising generating display data for the metadata-profile.

5. The computer-implemented method of claim 4, further comprising displaying on a user interface the display data for the metadata-profile.

6. The computer-implemented method of claim 5, wherein the display data comprises a visual representation of the at least one respective attribute of each of the tables of the cluster.

7. The computer-implemented method of claim 1, wherein the machine learning classifier is a Logistic Regression (LR) classifier, a Naive Bayes (NB) classifier, a Deep Learning Neural Network (NN), or a majority voting ensemble.

8. The computer-implemented method of claim 1, further comprising:
  grouping, using a plurality of machine learning classifiers, the plurality of tables in the dataset that are associated with the object into a plurality of clusters; and
  generating a plurality of respective metadata-profiles for each one of the clusters.

9. The computer-implemented method of claim 8, further comprising generating display data for the respective metadata-profiles.

10. The computer-implemented method of claim 9, further comprising displaying on a user interface the respective metadata-profiles.

11. The computer-implemented method of claim 10, wherein the display data comprises a visual representation of the respective metadata-profiles.

12. The computer-implemented method of claim 10, further comprising receiving a metadata-profile selection from among the respective metadata-profiles from a user.

13. A system for profiling a dataset, comprising: a distributed storage system configured to store a dataset comprising a plurality of tables associated with a plurality of different objects; a display device; at least one processor; and a memory operably coupled to the at least one processor, wherein the memory has computer-readable instructions stored thereon; a columnar storage module stored in the memory that, when executed by the at least one processor, is configured to store the plurality of tables of the dataset by column; a training data generation module stored in the memory that, when executed by the at least one processor, is configured to produce a training dataset; a machine learning classifier training module stored in the memory that, when executed by the at least one processor, is configured to train a machine learning classifier using the training dataset; a classification module stored in the memory that, when executed by the at least one processor, is configured to group, using the trained machine learning classifier, one or more of the plurality of tables in the dataset that are associated with an object into a cluster; a metadata-profile module stored in the memory that, when executed by the at least one processor, is configured to generate a metadata-profile for the plurality of tables of the cluster; and a display module configured to output a visualization of the metadata-profile for the plurality of tables of the cluster on the display device.

14. The system of claim 13, wherein the columnar storage module is a parallel column store.

15. The system of claim 13, further comprising a user interface configured to receive a query from a user.

16. The system of claim 13, wherein the machine learning classifier is a Logistic Regression (LR) classifier, a Naive Bayes (NB) classifier, a Deep Learning Neural Network (NN), or a majority voting ensemble.

17. The system of any claim 13, wherein the machine learning classifier is further configured to train a plurality of machine learning classifiers using the training dataset.

* * * * *